(12) United States Patent
Sugita

(10) Patent No.: US 8,564,893 B2
(45) Date of Patent: Oct. 22, 2013

(54) LENS BARREL SUPPORT APPARATUS

(75) Inventor: Jun Sugita, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 159 days.

(21) Appl. No.: 13/298,662

(22) Filed: Nov. 17, 2011

(65) Prior Publication Data

US 2012/0063021 A1 Mar. 15, 2012

Related U.S. Application Data

(63) Continuation of application No. 12/353,680, filed on Jan. 14, 2009, now Pat. No. 8,072,698.

(30) Foreign Application Priority Data

Jan. 18, 2008 (JP) ................................ 2008-008961

(51) Int. Cl.
*G02B 7/02* (2006.01)
(52) U.S. Cl.
USPC ........... 359/819; 359/818; 396/529; 396/530; 348/375

(58) Field of Classification Search
USPC ......... 359/811, 812, 818, 819, 822, 827, 829; 396/546, 529, 530, 532; 348/357, 335, 348/375
See application file for complete search history.

(56) References Cited

U.S. PATENT DOCUMENTS

| | | | | |
|---|---|---|---|---|
| 4,330,176 A | * | 5/1982 | Kawai | 359/503 |
| 5,327,292 A | * | 7/1994 | Eguchi | 359/827 |
| 2003/0218809 A1 | * | 11/2003 | Yamazaki et al. | 359/819 |

* cited by examiner

*Primary Examiner* — Scott J Sugarman
*Assistant Examiner* — Vipin Patel
(74) *Attorney, Agent, or Firm* — Canon U.S.A. Inc., IP Division

(57) ABSTRACT

A support apparatus supporting a lens barrel includes an annular fitting member, constructed by cutting a metal die case blank, to form an inner peripheral groove therein, and annular sheets disposed on front and rear cut surfaces of the inner peripheral groove in a direction of an optical axis. A plurality of engaging members provided on an outer peripheral surface of the lens barrel are positioned between the annular sheets disposed in the inner peripheral groove.

15 Claims, 4 Drawing Sheets

LENS BARREL SUPPORT APPARATUS

CROSS REFERENCE TO RELATED APPLICATIONS

This application is a Continuation of U.S. patent application Ser. No. 12/353,680 filed Jan. 14, 2009, which claims priority to Japanese Patent Application No. 2008-008961 filed Jan. 18, 2008, each of which are hereby incorporated by reference herein in their entireties.

BACKGROUND OF THE INVENTION

1. Field of the Invention

The present invention relates to a support apparatus supporting a lens barrel (i.e., a lens barrel support), which has a socket (such as a tripod mount) produced by metal die casting, and which is revolvable about an optical axis with respect to the tripod mount.

2. Description of the Related Art

A relatively large lens barrel for, e.g., a super-telephoto lens often includes a fixed or detachable tripod mount or the like for securely holding an image taking apparatus to a tripod or a monopod. Also, the lens barrel is generally rotatable about an optical axis of a lens, i.e., revolvable, while the tripod mount is held stationary, to take an image in any of landscape- and portrait-oriented frames.

FIG. 5A illustrates a structure of a lens barrel provided with a general tripod mount produced by metal die casting. A lens barrel 1 is held rotatably with respect to a tripod mount 2 by fitting an annular fitting member 2a, which is a part of the tripod mount 2, into a groove 1a formed in a fixed barrel as a part of the lens barrel 1. As shown in FIG. 5B, after rotating the lens barrel 1 relative to the annular fitting member 2a fitted into the groove 1a of the lens barrel 1 to a predetermined position, a fastening screw 2b is tightened such that the annular fitting member 2a clamps the lens barrel 1 to fix the lens barrel 1 at the predetermined rotated position.

In order to allow the revolving operation, a slight play needs to be left at a portion where the lens barrel 1 and the tripod mount 2 are fitted to each other. Also, when the annular fitting member 2a is fitted and held in the groove 1a of the lens barrel 1, the position of the center of gravity of the lens barrel 1, including a camera (not shown) mounted thereto, in the direction of the optical axis sometimes differs from the position where the lens barrel 1 is supported to the tripod mount 2.

In such a case, if a force acting to tilt the lens barrel 1 is applied to a fitting portion of the tripod mount 2, contact pressure caused by end surfaces 2c of the annular fitting member 2a abutting against front and rear walls 1b of the groove 1a, which are located in planes perpendicular to the optical axis in the lens barrel 1, is increased in accordance with the principle of leverage, thus generating a large load of resistance to rotation.

To overcome the above-described problem, in Japanese Patent Laid-Open No. 10-082935, the front and rear end surfaces of the annular fitting member 2a are brought into point contact with the corresponding walls of the groove 1a of the lens barrel 1 to reduce the area of a frictional surface and to decrease the load of resistance to rotation.

FIG. 6A illustrates another example of a lens barrel provided with a tripod mount. A tripod mount 4 is fixed to a lens barrel 3 by using an annular fitting member 4a. A plurality of screwed shaft pins are attached to an outer peripheral surface of the lens barrel 3 at predetermined angles in the circumferential direction, and cylindrical retaining collars 5 are rotatably inserted over the screwed shaft pins. On the other hand, an inner peripheral groove 4b is formed inside the annular fitting member 4a, and guide grooves 4c are formed to extend perpendicularly to the inner peripheral groove 4b in continuation with it in the same number as the retaining collars 5 for guiding the retaining collars 5 to the inner peripheral groove 4b.

The annular fitting member 4a is fitted to the lens barrel 3 by introducing the retaining collars 5, which are attached to the lens barrel 3, to the inner peripheral groove 4b through the guide grooves 4c, and by rotating the annular fitting member 4a to be engaged in the inner peripheral groove 4b. Thus, the lens barrel 3 is engaged with and supported to the tripod mount 3 in a state rotatable about the optical axis. By tightening a fastening screw 4d, the lens barrel 3 can be fixed to a desired rotated position.

Alternatively, instead of the guide grooves 4c, tooling holes can be bored in the lens barrel 3 from the outer peripheral side at positions coincident with the inner peripheral groove 4b in the direction of the optical axis. In this case, after fitting the annular fitting member 4a over the lens barrel 3, retaining collars 5 are inserted through the tooling holes and are assembled to the lens barrel 3 by using screwed shaft pins. The tooling holes are not exposed to the exterior in a finished state because they are concealed by another part after the assembling of the retaining collars 5.

The assembly method using the guide grooves 4c enables a user to detach the tripod mount 4 from the lens barrel 3, while the assembly method using the outer-peripheral tooling holes does not allow the user to detach the tripod mount 4 from the lens barrel 3.

The retaining collars 5 are selected to have a slight fitting play with respect to the width of the inner peripheral groove 4b of the tripod mount 4 so that the lens barrel 3 is smoothly rotatable without undergoing resistance. With the related art shown in FIGS. 6A and 6B, unlike the structure of FIGS. 5A and 5B in which the tripod mount 2 is fitted into the groove 1a of the lens barrel 1, a load imposed in the direction of the optical axis is generated as rotational friction. Accordingly, even when the position of the center of gravity of the lens barrel 3 in the direction of the optical axis fairly differs from the position where the lens barrel 3 is supported to the tripod mount 4, the operation of revolving the lens barrel 4 can be performed with a relatively small load.

The tripod mounts 2 and 4 need sufficient strength and are difficult to have a rotationally symmetrical shape. For that reason, the tripod mounts 2 and 4 are generally manufactured through the steps of producing a blank of each tripod mount by metal die casting, and forming the fitting portion (diameter), the engaging groove, etc. in match with a body of the lens barrel 1 or 3 by secondary working using a lathe.

In the case of the tripod mount 4 shown in FIGS. 6A and 6B, the inner peripheral groove 4b is formed by secondary working. FIG. 7 illustrates a finished shape of the annular fitting member 4a obtained by machining a blank of the tripod mount 4 shown in FIGS. 6A and 6B, which has been produced by metal die casting, to cut an unnecessary portion, indicated by dotted lines, of the annular fitting member 4a with a lathe, thus forming the inner peripheral groove 4b by the secondary working.

In general metal die casting, however, when a die casting material is poured into a die, a slight amount of air is entrained with the die casting material in some cases. Accordingly, porosities (cavities) are often generated in a central region of a thick portion where the applied casting pressure tends to be insufficient. This increases a possibility that porosities appear on the cut surface when a cutting amount by the secondary working is large as in the case of machining the inner peripheral groove 4b shown in FIG. 7.

If porosities are exposed to the surface of the inner peripheral groove 4b, i.e., its sliding surface in contact with the retaining collars 5, as in the example shown in FIGS. 6A and 6B, a feeling of the revolving operation deteriorates upon the retaining collars 5 sliding against the porosities when the lens barrel 3 is revolved.

Another problem is that, because the annular fitting member 4a has insufficient strength and is apt to brittle at locations where the porosities are generated, the sliding surface is apt to crumble with repeated sliding movements, thus generating wear debris.

A metal die casting method for making porosities hard to generate inside a die-cast product (i.e., a die cast) is also known as, for example, a vacuum die casting method of pouring a die casting material into a die after the interior of the die has been evacuated to a vacuum state, or a PF (Pore Free) method of filling the interior of the die with active oxygen. However, those methods have the problems of needing large man-hours and increasing the cost.

SUMMARY OF THE INVENTION

According to an exemplary embodiment of the present invention, a support apparatus is provided including a supporting a lens barrel include an annular fitting member, constructed by cutting a metal die case blank, to form an inner peripheral groove therein, and annular sheets disposed on front and rear cut surfaces of the inner peripheral groove in a direction of an optical axis. Also, a plurality of engaging members provided on an outer peripheral surface of the lens barrel are positioned between the annular sheets disposed in the inner peripheral groove.

Further features of the present invention will become apparent from the following description of exemplary embodiments with reference to the attached drawings.

DESCRIPTION OF THE EMBODIMENTS

In a support apparatus supporting a lens barrel (also called a lens barrel support apparatus) according to one exemplary embodiment of the present invention, secondary working is performed on a blank produced by metal die casting to form an inner peripheral groove in the blank, and an annular sheet is attached to the inner peripheral groove. Thus, the lens barrel support apparatus is provided as ensuring a good feeling when a lens barrel is revolved. In a lens barrel support apparatus according to another exemplary embodiment of the present invention, a part of the inner peripheral groove is formed in the blank and a retaining ring is engaged with the blank to form the entire inner peripheral groove.

The present invention will be described in detail below in connection with exemplary embodiments shown in FIGS. 1 to 4.

Figure 1:
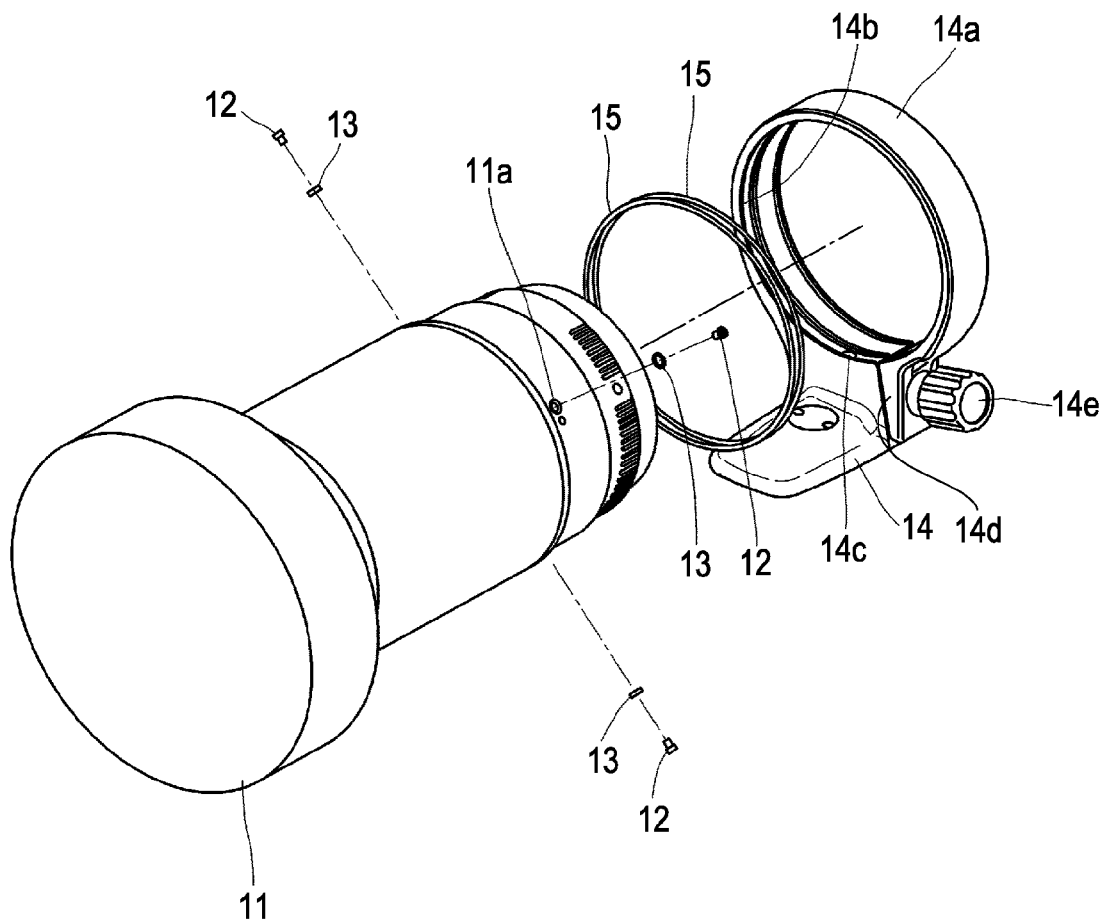
FIG. 1 is an exploded perspective view of a lens barrel support apparatus according to a first exemplary embodiment of the present invention.
Figure 2:
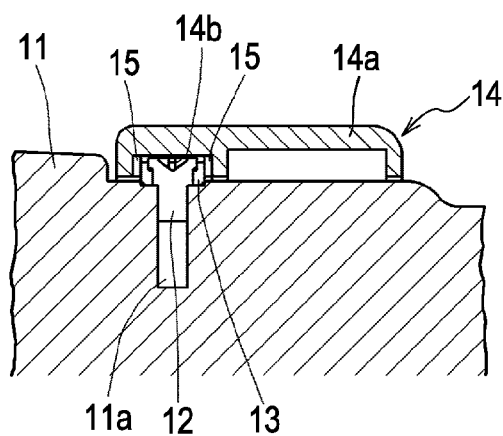
FIG. 2 is a partial sectional view of the lens barrel support apparatus according to the first exemplary embodiment.

FIG. 1 is an exploded perspective view of a lens barrel support apparatus according to a first exemplary embodiment of the present invention, and a lens barrel body held by the lens barrel support apparatus. FIG. 2 is a partial sectional view of the lens barrel support apparatus (specifically a barrel support of a tripod mount). Note that, while the first exemplary embodiment is described as supporting a lens barrel body or a camera body by a tripod, a monopod or the like can also be used in stead of the tripod.

As shown in FIG. 1, threaded holes (bores) 11a are formed in an outer peripheral surface of a lens barrel body 11 at predetermined angular intervals about an optical axis (at the same position in the direction of the optical axis) (in this exemplary embodiment, three screwed holes are formed at intervals of 120°). Screwed shaft pins 12 and retaining collars (engaging members) 13 are disposed corresponding to the threaded holes 11a, respectively. The screwed shaft pins 12 screwed into the threaded holes 11a rotatably hold the retaining collars 13. The threaded holes 11a, the screwed shaft pins 12, and the retaining collars 13 are fixedly disposed on the lens barrel body 11 at the same position in the direction of the optical axis.

A tripod mount 14 will be described below. The tripod mount 14 includes an annular fitting member 14a which is fitted over the lens barrel body 11. An inner peripheral groove 14b is formed in an inner periphery (inner surface) of the annular fitting member 14a. The inner peripheral groove 14b engages with the retaining collars 13 (more exactly speaking, lateral surfaces of the inner peripheral groove 14b contact with lateral surfaces of the retaining collars 13 in the direction of the optical axis), thereby fixedly maintaining the relative positional relationship between the tripod mount 14 and the lens barrel body 11 (i.e., the positional relationship in the direction of the optical axis between them).

Further, a tooling hole 14c is bored in a bottom portion (on the side closest to the tripod) of the annular fitting member 14a. In addition, the annular fitting member 14a has a slit formed in a leg portion 14d such that the annular fitting member 14a is partly split. The inner diameter of the annular fitting member 14a is reduced by tightening a lock screw 14e.

The tripod mount 14 is obtained by cutting a blank, which is produced by metal die casting, with a lathe (in other words, the tripod mount 14 is a cast produced by the metal die casting). Herein, the term "blank" implies a cast which is produced by the metal die casting, but which is not yet subjected to the cutting with a lathe. Because the inner peripheral groove 14b is formed by cutting the blank, produced by the metal die casting, in a large amount, porosities generated in the blank with the metal die casting are often exposed to the cut surface of the inner peripheral groove 14b. If the porosities generated in the blank with the metal die casting (i.e., cavities generated inside a die cast due to metal shrinkage or deficiency of pressure when a molten metal is poured under pressure into a die) are exposed to the cut surface of the inner peripheral groove 14b, smooth sliding between the inner peripheral groove 14b and the retaining collars 13 is not ensured. To avoid such a drawback, two annular sheets 15 each made of a metal material (i.e., metal-made annular sheets 15) are disposed on front and rear cut surfaces of the inner peripheral groove 14b as viewed in the direction of the optical axis (i.e., surfaces of the inner peripheral groove 14b contacting with the retaining collars 13, namely front and rear end (faces) of the inner peripheral groove 14b as viewed in the direction of the optical axis). The annular sheet 15 is made of a flexible thin metal sheet. According to such an arrangement, the porosities generated with the die casting and exposed to the surface can be covered with the annular sheets 15 and, therefore, smoothness in sliding between the inner peripheral groove 14b and the retaining collars 13 can be improved. Additionally, the annular sheet 15 has an outer diameter larger than the diameter of the inner peripheral groove 14b. Herein, the diameter of the inner peripheral groove 14b may be a diameter of the inner peripheral groove at the outermost side thereof, i.e., a maximum diameter of the inner peripheral groove. Therefore, the annular sheet 15 is assembled into the inner peripheral groove 14b while it is deformed so as to flex for coming into the annular fitting member 14a.

The tripod mount 14 including the annular sheets 15 is assembled to the lens barrel body 11 as follows. First, the annular fitting member 14a of the tripod mount 14 is loosely fitted over the lens barrel body 11. Then, the annular fitting member 14a is rotated to locate the tooling hole 14c, which is formed at the bottom portion of the annular fitting member 14a, in match with the position of (i.e., the location for attaching) one of the retaining collars 13 to be disposed on the lens barrel body 11, and the one retaining collar 13 is fixedly positioned between the two annular sheets 15 in the inner peripheral groove 14b. After fixedly positioning all the retaining collars 13, the tooling hole 14c is closed by, e.g., a cover member (not shown).

After rotating the lens barrel body 11 to a desired angular position relative to the tripod mount 14, the lock screw 14e is tightened to fix the lens barrel body 11. When the lens barrel body 11 is rotated again relative to the tripod mount 14 by loosening the lock screw 14e, the retaining collars 13 are caused to slide while contacting with the two annular sheets 15 on both sides thereof. Accordingly, even when the porosities generated with the die casting are exposed to the surface of the inner peripheral groove 14b, a good feeling can be ensured when the lens barrel body 11 is rotated.

To reduce the load produced when the lens barrel body 11 is rotated, bearings (rotatable members) can be used instead of the retaining collars 13 in this exemplary embodiment. In addition, a similar advantage can also be obtained when fixed engaging projections, such as for bayonet engagement, are used instead of the retaining collars 13.

While the annular sheet 15 is made of a metal material in the above-described exemplary embodiment, a similar advantage can be obtained even when the annular sheet 15 is a resin sheet made of a low-friction material. The annular sheet 15 can be fixedly held in the inner peripheral groove 14b by using an adhesive or a double-faced tape. However, because the annular sheet 15 is pressed by the retaining collars 13, the revolving operation of the lens barrel body 11 is free from problems even with the annular sheet 15 not fixed.

Figure 3:
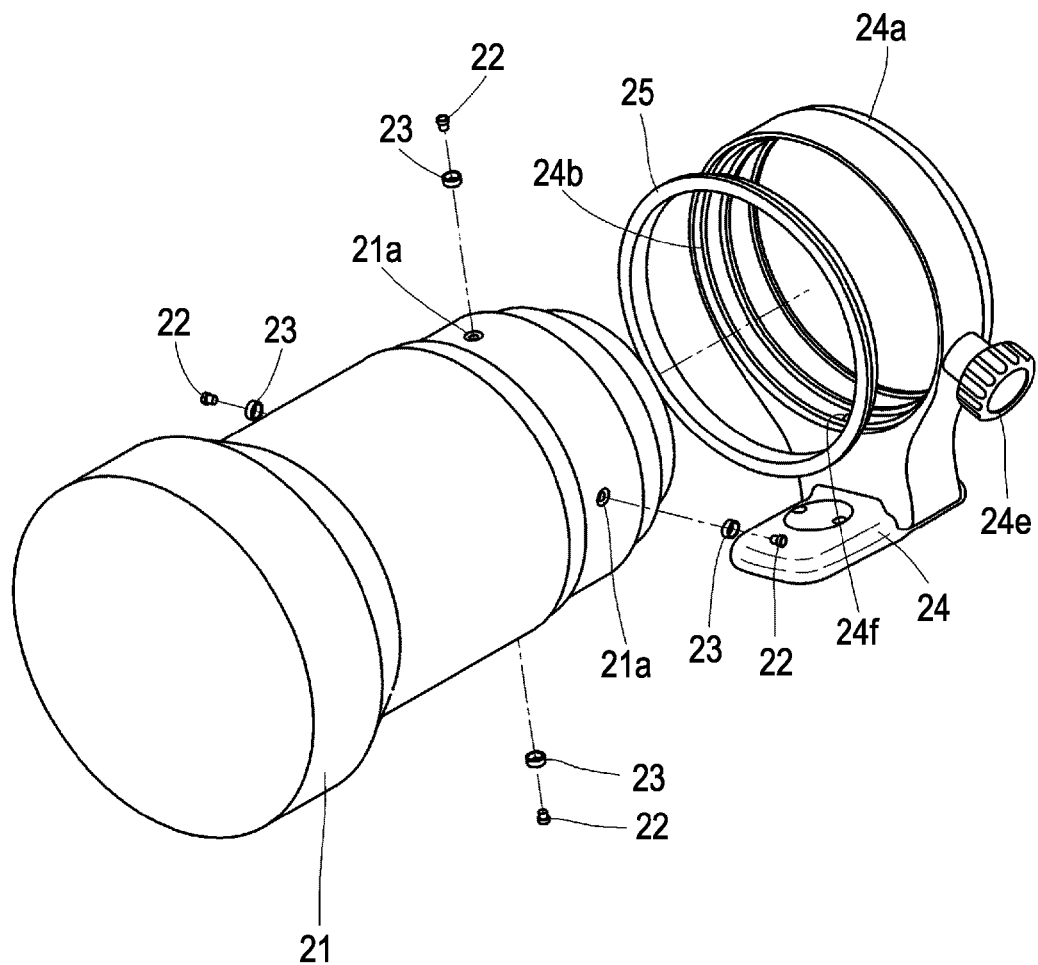
FIG. 3 is an exploded perspective view of a lens barrel support apparatus according to a second exemplary embodiment of the present invention.
Figure 4:
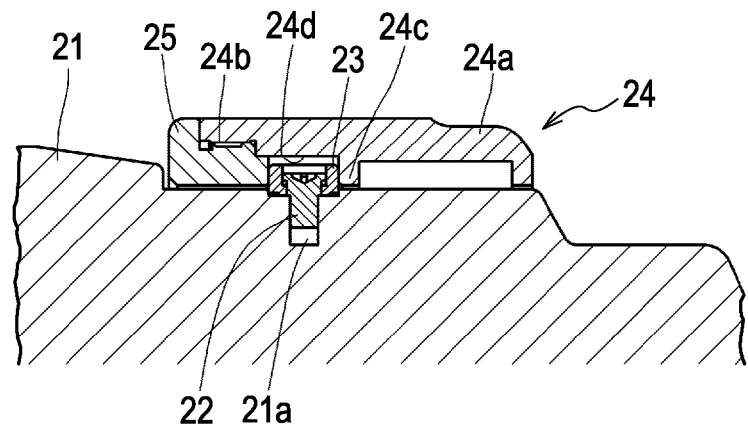
FIG. 4 is a partial sectional view of the lens barrel support apparatus according to the second exemplary embodiment.
Figure 5A:
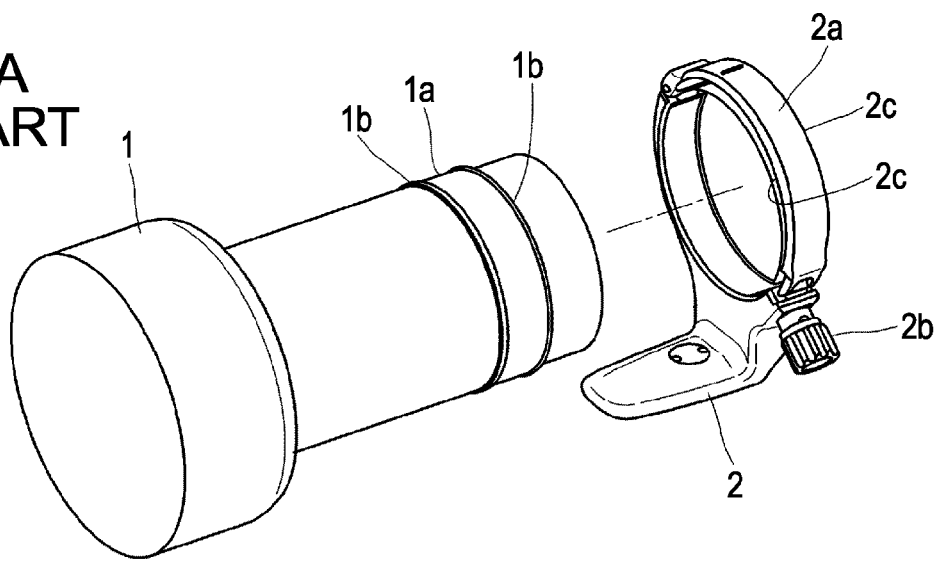
FIGS. 5A and 5B illustrate a known lens barrel provided with a tripod mount.
Figure 5B:
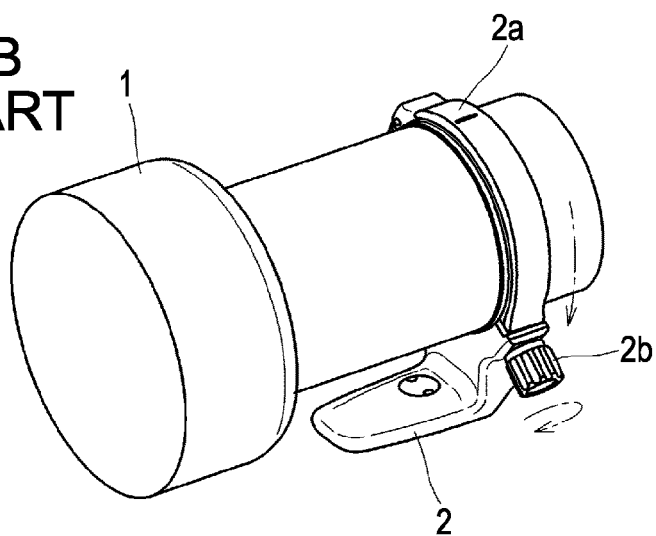
Figure 6A:
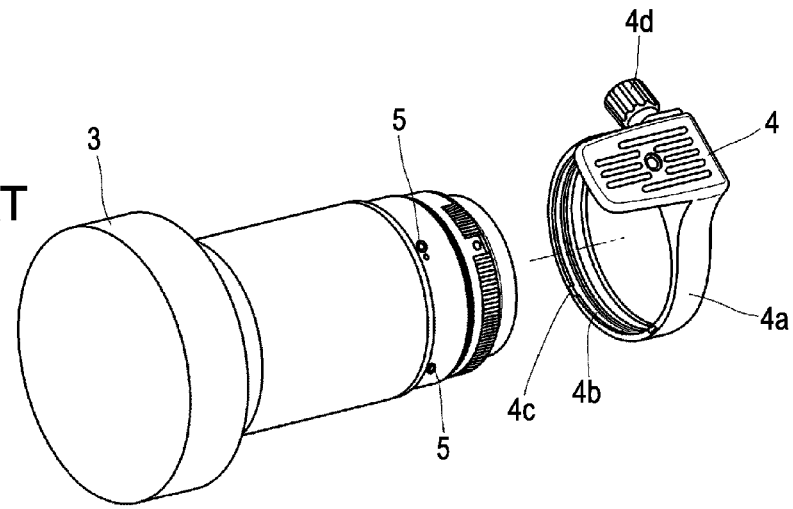
FIGS. 6A and 6B illustrate another known lens barrel provided with a tripod mount.
Figure 6B:
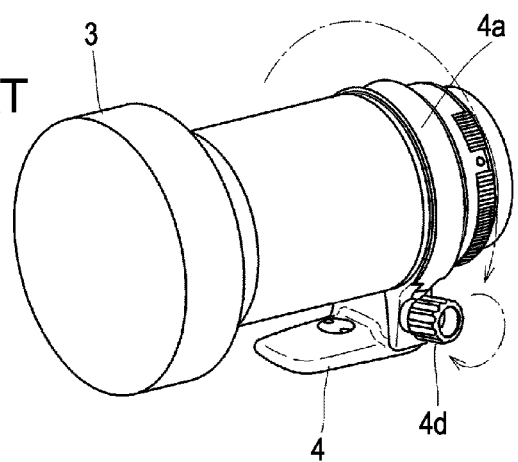
Figure 7:
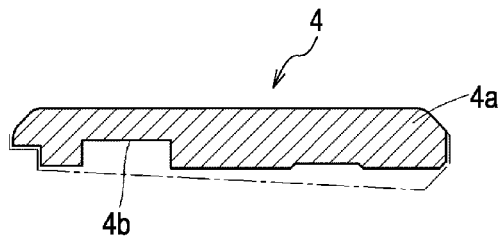
FIG. 7 is a sectional view of a blank of an annular fitting member after cutting.

FIG. 3 is an exploded perspective view of a lens barrel support apparatus according to a second exemplary embodiment of the present invention, and a lens barrel body held by lens barrel support apparatus. FIG. 4 is a partial sectional view of the lens barrel support apparatus (specifically a barrel support of a tripod mount). Note that other points than not described in detail below are the same as those in the first exemplary embodiment.

As in the first exemplary embodiment, a plurality of retaining collars 23 are rotatably held on an outer peripheral surface of a lens barrel body 21 at predetermined angular intervals about an optical axis by screwed shaft pins 22 which are screwed into threaded shaft holes 21a. A tripod mount 24 is obtained, as in the first exemplary embodiment, through the steps of producing a blank by metal die casting and finishing an inner peripheral surface of an annular fitting member 24a by cutting with a lathe. A threaded portion in an outer peripheral surface of a retaining ring 25, which has substantially the same diameter as the annular fitting member 24a, is engaged with a threaded portion 24b which is formed in part of an inner peripheral surface of the annular fitting member 24a. As a result, an inner peripheral groove 24d similar to the inner peripheral groove 14b in the first exemplary embodiment is defined between a lateral surface of the retaining ring 25 (i.e., an end surface of the retaining ring 25 on the side facing a stepped portion 24c of the annular fitting member 24a in the direction of the optical axis) and the stepped portion 24c of the annular fitting member 24a.

Further, the annular fitting member 24a is constituted to be able to vary its inner diameter by operating (loosening or tightening) a lock screw 24e, and a tooling hole 24f is bored in a bottom portion of the annular fitting member 24a, as in the first exemplary embodiment. The inner peripheral surface of the annular fitting member 24a is finished by cutting with a lathe. In this second exemplary embodiment, however, a portion (area) where the retaining collars 13 are directly contacted with the inner peripheral surface of the annular fitting member 24a is relatively small. Accordingly, even when porosities are generated in the annular fitting member 24a with the metal die casting, an influence of the porosities can be held small.

The tripod mount 24 is assembled to the lens barrel body 21 as follows. First, the retaining ring 25 and the annular fitting member 24a are screwed to each other, and the lens barrel body 21 is inserted through those assembled parts. Then, the tripod mount 24 is rotated about the optical axis to locate the tooling hole 24f, which is formed at the bottom portion of the annular fitting member 24a, in match with one of the threaded shaft hole 21a formed in the lens barrel body 21, and the one retaining collar 23 is fixedly positioned with the aid of the threaded shaft pin 22. After fixedly positioning all the retaining collars 23, the tooling hole 24f is closed by, e.g., a cover member (not shown).

After rotating the lens barrel body 21 to a desired angular position relative to the tripod mount 24, the lock screw 24e is tightened to fix the lens barrel body 21. When the lens barrel body 21 is rotated again relative to the tripod mount 24, a good feeling can be ensured for the reason that the porosities generated with the die casting are less exposed at the front and rear surfaces of the inner peripheral groove 24d against which the retaining collars 23 slide while contacting them (i.e., an influence of the porosities generated with the die casting is small).

With the lens barrel support apparatus according to the exemplary embodiment of the present invention, as described above, since the annular fitting member is fabricated through the steps of producing a blank by the metal die casting, forming the inner peripheral groove in the annular fitting member by the secondary working, and disposing the annular sheets in the inner peripheral groove, smooth rotation of the lens barrel body at a certain position, i.e., satisfactory revolving operation, can be realized. The reason is that, even when porosities generated in the blank with the metal die casting are exposed by cutting, the porosities are covered with the annular sheets.

Further, since the inner peripheral groove for engagement with the lens barrel body is formed by coupling the retaining ring and the annular fitting member which is produced by the metal die casting, a lens barrel support apparatus can be realized which ensures a good feeling in the revolving operation of the lens barrel body.

While the first and second exemplary embodiments have been described above in connection with the lens barrel support apparatus, the present invention is not limited to the lens barrel support apparatus, and it can also be applied to a lens apparatus and an image pickup apparatus each including a lens barrel support which rotatably supports a lens barrel.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A support apparatus adapted to support a lens barrel, the apparatus including:
   an annular fitting member, constructed by cutting a metal die cast blank, to form an inner peripheral groove therein; and
   annular sheets disposed on front and rear cut surfaces of the inner peripheral groove in a direction of an optical axis,
   wherein rotatable members rotatable about a plurality of shafts provided on an outer peripheral surface of the lens barrel are positioned between the annular sheets disposed in the inner peripheral groove when the support apparatus supports the lens barrel.

2. The support apparatus according to claim 1, wherein the rotatable member is a bearing.

3. The support apparatus according to claim 1, wherein the annular sheet is made of a metal.

4. The support apparatus according to claim 1, wherein the annular sheet is made of a resin.

5. The support apparatus according to claim 1, wherein the annular sheet has an outer diameter larger than a diameter of the inner peripheral groove.

6. A lens apparatus including:
   a lens barrel including a lens, the lens barrel including rotatable members rotatable about a plurality of shafts provided on an outer peripheral surface of the lens barrel; and
   a barrel support apparatus supporting the lens barrel, the lens barrel support apparatus including,
      an annular fitting member, constructed by cutting a metal die cast blank, to form an inner peripheral groove therein; and
      annular sheets disposed on front and rear cut surfaces of the inner peripheral groove in a direction of an optical axis,
   wherein rotatable members are positioned between the annular sheets disposed in the inner peripheral groove.

7. The lens apparatus according to claim 6, wherein the annular fitting member and a body of the lens barrel are relatively rotatable about the optical axis.

8. A support apparatus supporting a lens barrel, the apparatus including:
   an annular fitting member, constructed by cutting a metal die cast blank, to form a stepped portion therein; and
   a retaining ring coupled to an end of the annular fitting member in a direction of an optical axis to form an inner peripheral groove in cooperation with the stepped portion,
   wherein rotatable members rotatable about a plurality of shafts provided on an outer peripheral surface of the lens barrel are positioned in the inner peripheral groove when the support apparatus supports the lens barrel.

9. The support apparatus according to claim 8, wherein the rotatable member is a bearing.

10. The support apparatus according to claim 8, wherein the retaining ring is coupled to the annular fitting member by a screwing feature.

11. A lens apparatus including:
   a lens barrel including a lens, the lens barrel including rotatable members rotatable about a plurality of shafts provided on an outer peripheral surface of the lens barrel; and
   a barrel support apparatus supporting the lens barrel, the lens barrel support apparatus including,
      an annular fitting member, constructed by cutting a metal die cast blank, to form a stepped portion therein; and
      a retaining ring coupled to an end of the annular fitting member in a direction of an optical axis to form an inner peripheral groove in cooperation with the stepped portion,
   wherein rotatable members are positioned in the inner peripheral groove.

12. The lens apparatus according to claim 11, wherein the annular fitting member and a body of the lens barrel are relatively rotatable about the optical axis.

13. A lens apparatus according to claim 11, wherein the rotatable members are positioned in the inner peripheral groove between the lens barrel and the annular fitting member so that one end of each of the rotatable members is in contact with the retaining ring and another end of each of the rotatable members is in contact with the annular fitting member.

14. A support apparatus adapted to support a lens barrel, the apparatus including:
   an annular fitting member, constructed by cutting a metal die cast blank, to form an inner peripheral groove therein; and
   annular sheets disposed on front and rear cut surfaces of the inner peripheral groove in a direction of an optical axis,
   wherein a plurality of projections integrally provided on an outer peripheral surface of the lens barrel is positioned between the annular sheets disposed in the inner peripheral groove when the support apparatus supports the lens barrel.

15. A support apparatus supporting a lens barrel, the apparatus including:
   an annular fitting member, constructed by cutting a metal die cast blank, to form a stepped portion therein; and
   a retaining ring coupled to an end of the annular fitting member in a direction of an optical axis to form an inner peripheral groove in cooperation with the stepped portion,
   wherein a plurality of projections integrally provided on an outer peripheral surface of the lens barrel is positioned in the inner peripheral groove when the support apparatus supports the lens barrel.

* * * * *